United States Patent
Shiraishi et al.

(10) Patent No.: US 12,354,356 B2
(45) Date of Patent: Jul. 8, 2025

(54) VIDEO PROCESSING DEVICE, VIDEO PROCESSING METHOD, AND RECORDING MEDIUM

(71) Applicant: NEC Corporation, Tokyo (JP)

(72) Inventors: Soma Shiraishi, Tokyo (JP); Katsumi Kikuchi, Tokyo (JP); Yu Nabeto, Tokyo (JP); Haruna Watanabe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 241 days.

(21) Appl. No.: 17/926,711

(22) PCT Filed: May 27, 2020

(86) PCT No.: PCT/JP2020/020869
§ 371 (c)(1),
(2) Date: Nov. 21, 2022

(87) PCT Pub. No.: WO2021/240679
PCT Pub. Date: Dec. 2, 2021

(65) Prior Publication Data
US 2023/0206636 A1    Jun. 29, 2023

(51) Int. Cl.
*H04N 21/8549* (2011.01)
*G06V 20/40* (2022.01)

(52) U.S. Cl.
CPC .............. *G06V 20/47* (2022.01); *G06V 20/42* (2022.01); *H04N 21/8549* (2013.01)

(58) Field of Classification Search
CPC ...... G06V 20/47; G06V 20/42; G06V 40/172; H04N 21/8549; H04N 5/91; H04N 21/23418; G06F 16/739; G06F 16/784

USPC .......................................................... 386/278
See application file for complete search history.

(56) References Cited

U.S. PATENT DOCUMENTS

| | | | | |
|---|---|---|---|---|
| 8,472,788 | B2 * | 6/2013 | Takagi | G11B 27/28 386/280 |
| 10,134,439 | B2 * | 11/2018 | Matsuoka | G11B 27/005 |
| 11,153,625 | B2 * | 10/2021 | Yoshikawa | H04N 5/2628 |
| 11,270,118 | B2 * | 3/2022 | Nagata | G06V 20/40 |
| 11,399,208 | B2 * | 7/2022 | Sivaramalingam | H04N 21/234318 |

(Continued)

FOREIGN PATENT DOCUMENTS

| | | |
|---|---|---|
| JP | 2001-251581 A | 9/2001 |
| JP | 2003-333500 A | 11/2003 |

(Continued)

OTHER PUBLICATIONS

JP Office Action for JP Application No. 2022-527350, mailed on Oct. 10, 2023 with English Translation.

(Continued)

*Primary Examiner* — Helen Shibru

(57) ABSTRACT

The video processing device includes a video acquisition means, a person identification means, an importance calculation means, and an importance integration means. The video acquisition means acquires a material video. The person identification means identifies a person from the material video. The importance calculation means calculates an importance of the material video. The importance integration means integrates the importance for each person and outputs a person importance indicating an importance for each person.

7 Claims, 12 Drawing Sheets

(56) References Cited

U.S. PATENT DOCUMENTS

| | | | |
|---|---|---|---|
| 11,420,623 B2* | 8/2022 | Tawari | G06V 20/58 |
| 12,010,371 B2* | 6/2024 | Kikuchi | H04N 21/8549 |
| 2012/0076357 A1 | 3/2012 | Yamamoto et al. | |
| 2019/0182436 A1 | 6/2019 | Gupta et al. | |
| 2022/0417488 A1* | 12/2022 | Liu | G11B 27/28 |
| 2023/0196775 A1* | 6/2023 | Shiraishi | G06V 20/41 |
| | | | 382/155 |
| 2023/0199194 A1* | 6/2023 | Shiraishi | H04N 21/44008 |
| | | | 348/700 |
| 2023/0205815 A1* | 6/2023 | Watanabe | H04N 5/91 |
| | | | 707/737 |
| 2023/0300392 A1* | 9/2023 | Kansara | H04N 21/234372 |
| | | | 348/445 |
| 2024/0062545 A1* | 2/2024 | Nabeto | H04N 5/91 |

FOREIGN PATENT DOCUMENTS

| | | | | |
|---|---|---|---|---|
| JP | 2004-112110 A | 4/2004 | | |
| JP | 2006-012052 A | 1/2006 | | |
| JP | 2008-022103 A | 1/2008 | | |
| JP | 2012-070283 A | 4/2012 | | |
| WO | WO-2021234779 A1 * | 11/2021 | | G11B 27/031 |
| WO | WO-2021240652 A1 * | 12/2021 | | G06F 16/65 |

OTHER PUBLICATIONS

International Search Report for PCT Application No. PCT/JP2020/020869, mailed on Sep. 1, 2020.

* cited by examiner

<AT THE TIME OF TRAINING>

<AT THE TIME OF INFERENCE>

VIDEO PROCESSING DEVICE, VIDEO PROCESSING METHOD, AND RECORDING MEDIUM

This application is a National Stage Entry of PCT/JP2020/020869 filed on May 27, 2020, the contents of all of which are incorporated herein by reference, in their entirety.

TECHNICAL FIELD

The present invention relates to processing of video data.

BACKGROUND ART

In TV news and sports programs, digest videos including highlights of sports games such as baseball and soccer are broadcasted. Until now, such digest videos have been generated by editors who are familiar with the sport. However, in recent years, there has been proposed a technique for automatically generating a digest video from a video of a game. For example, Patent Document 1 discloses a highlight extraction device that creates learning data files from training moving images prepared in advance and the moving images of important scenes designated by a user, and detects important scenes from the moving image on the basis of the learning data files.

PRECEDING TECHNICAL REFERENCES

Patent Document

Patent Document L Japanese Patent Application Laid-Open under No. JP 2008-022103

SUMMARY

Problem to be Solved by the Invention

In the case where a digest video of a sport game automatically produced as described above, the score recorded in the game was used for the evaluation of the player's performance in that game. For example, the degree of activity in a baseball game is evaluated in terms of the number of hits, the number of home runs, the batting average, and the like in case of a batter, and in terms of the earned run average, lost runs, and the number of strikeouts, and the like in case of a pitcher. However, in this case, it was difficult to evaluate a play that is highly contributing but does not appear in the numerical values such as scores, such as a fine play that prevented decisive scores, for example.

An object of the present invention is to provide a video processing device capable of evaluating the degree of activity of the player in consideration of the plays that do not appear in the numerical values indicating the performance, based on sports videos.

Means for Solving the Problem

According to an example aspect of the present invention, there is provided a video processing device comprising:
a video acquisition means configured to acquire a material video;
a person identification means configured to identify a person from the material video;
an importance calculation means configured to calculate an importance of the material video; and
an importance integration means configured to integrate the importance for each person and output a person importance indicating an importance of each person.

According to another example aspect of the present invention, there is provided a video processing method comprising:
acquiring a material video;
identifying a person from the material video;
calculating an importance of the material video; and
integrating the importance for each person and outputting a person importance indicating an importance of each person.

According to still another example aspect of the present invention there is provided a recording medium recording a program that causes a computer to perform processing comprising:
acquiring a material video;
identifying a person from the material video;
calculating an importance of the material video; and
integrating the importance for each person and outputting a person importance indicating an importance of each person.

Effect of the Invention

According to the present invention, it is possible to evaluate the degree of activity of the player in consideration of the plays that do not appear in the numerical values indicating the performance, based on sports videos.

EXAMPLE EMBODIMENTS

Preferred example embodiments of the present invention will be described with reference to the accompanying drawings.

First Example Embodiment

First, a person importance calculation device according to a first example embodiment of the present invention will be described. The person importance calculation device calculates and outputs the importance for each person appearing in the material video based on the material video.

[Basic Principle]

Figure 1:
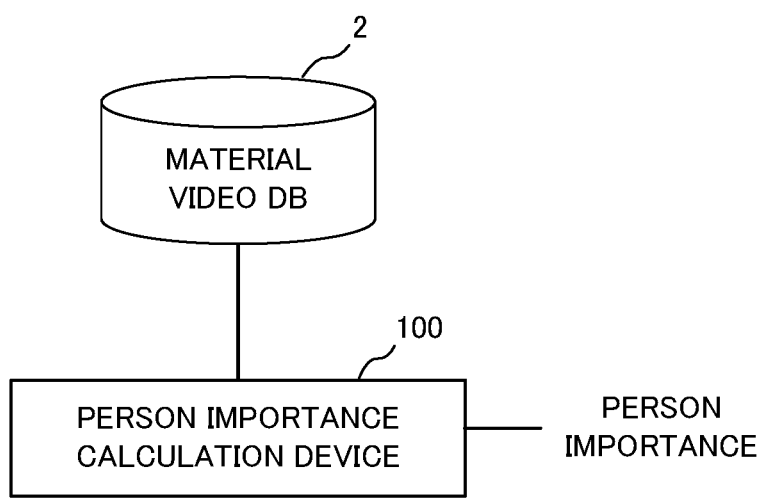
FIG. 1 shows a schematic configuration of a person importance calculation device.

FIG. 1 shows a schematic configuration of a person importance calculation device 100. The person importance calculation device 100 is connected to a material video database (hereinafter, "database" is also referred to as "DB") 2. The material video DB 2 stores various material videos, i.e., moving images. The material video may be, for example, a video such as a television program broadcasted from a broadcasting station, a video that is distributed on the Internet, or the like. It is noted that the material video may or may not include sound. The person importance calculation device 100 outputs the importance (importance score) of each person as the person importance for each person included in the material video acquired from the material video DB 2.

Figure 2:
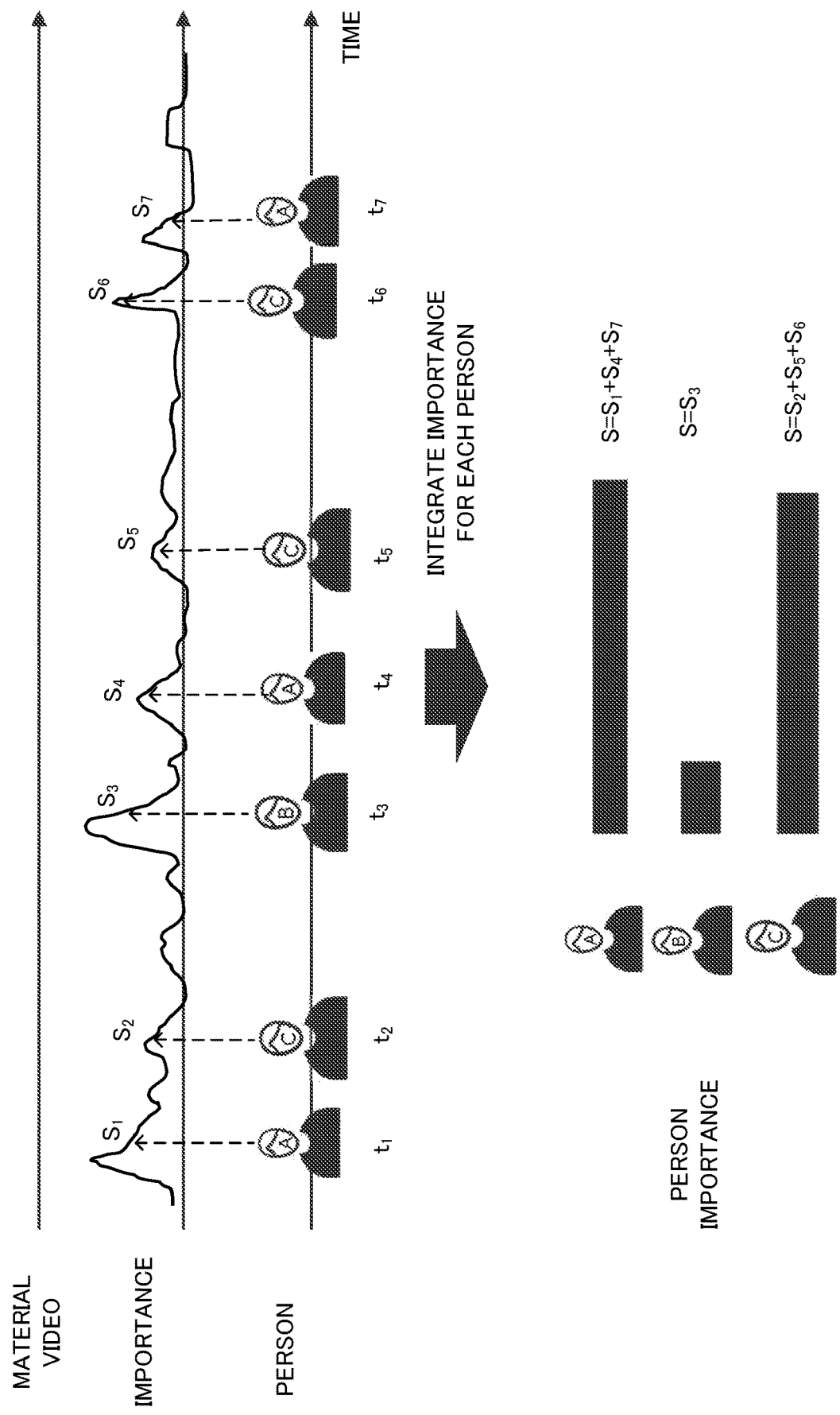
FIG. 2 schematically shows a method for generating person importance.

FIG. 2 schematically shows a method of generating the person importance by the person importance calculation device 100. The person importance calculation device 100 first calculates the importance in the material video. In addition, the person importance calculation device 100 recognizes the person appearing in the material video. Then, the person importance calculation device 100 acquires the importance of the material video when the person appears for each person appearing in the material video, and integrates them to calculate the person importance which is the importance of each person. In the example of FIG. 2, the person A is recognized at the time $t_1$ of the material video, and the importance of the material video at that time is $S_1$. The person A is also recognized at the time $t_4$, and the importance of the material video at that time is $S_4$. The person A is further recognized at the time $t_7$, and the importance of the material video at that time is $S_7$. In this case, the person importance S of the person A in the entire material video is calculated as follows.

$$S=S_1+S_4+S_7$$

The person importance is calculated for other persons B and C in the same manner. As described above, each time a person is recognized, the person importance calculation device 100 integrates the importance of the material video at that time as the person importance of the person, and calculates the person importance in the entire material video.

[Hardware Configuration]

Figure 3:
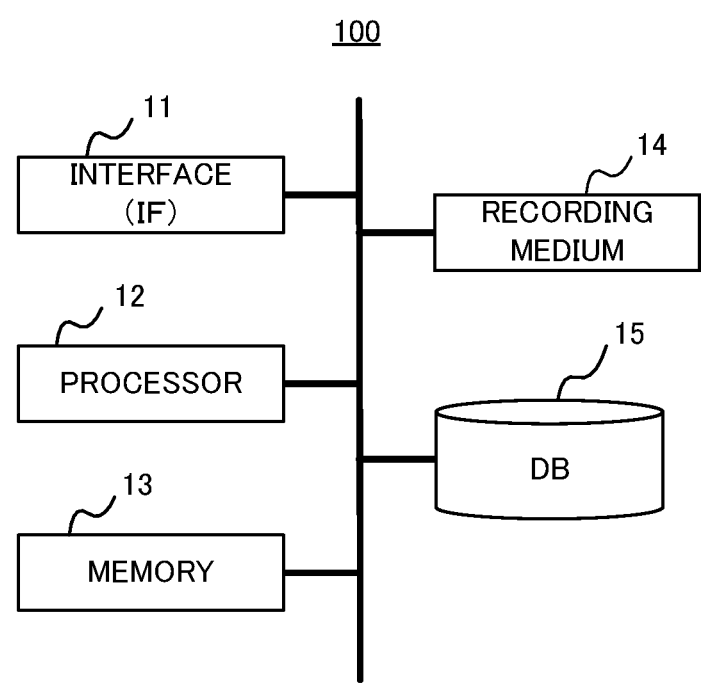
FIG. 3 is a block diagram showing a hardware configuration of a person importance calculation device.

FIG. 3 is a block diagram illustrating a hardware configuration of the person importance calculation device 100. As illustrated, the person importance calculation device 100 includes an interface (IF) 11, a processor 12, a memory 13, a recording medium 14, and a DB 15.

The IF 11 inputs and outputs data to and from external devices. Specifically, the material video stored in the material video DB 2 is inputted to the person importance calculation device 100 via the IF 11. Further, the person importance generated by the person importance calculation device 100 is outputted to an external device through the IF 11.

The processor 12 is a computer, such as a CPU (Central Processing Unit), and controls the entire person importance calculation device 100 by executing a previously prepared program. Specifically, the processor 12 executes person importance calculation processing described later.

The memory 13 is a ROM (Read Only Memory), a RAM (Random Access Memory), and the like. The memory 13 is also used as a work memory during the execution of various processing by the processor 12.

The recording medium 14 is a non-volatile, non-transitory recording medium such as a disk-shaped recording medium, a semiconductor memory, or the like, and is configured to be detachable from the person importance calculation device 100. The recording medium 14 records various programs to be executed by the processor 12. When the person importance calculation device 100 executes various kinds of processing, the program recorded on the recording medium 14 is loaded into the memory 13 and executed by the processor 12.

The database 15 temporarily stores the material video inputted through the IF 11, and the person importance generated by the person importance calculation device 100. Incidentally, the person importance calculation device 100 may include an input unit such as a keyboard and a mouse, and a display unit such as a liquid crystal display for the editor to perform instructions and inputs.

[Functional Configuration]

Figure 4:
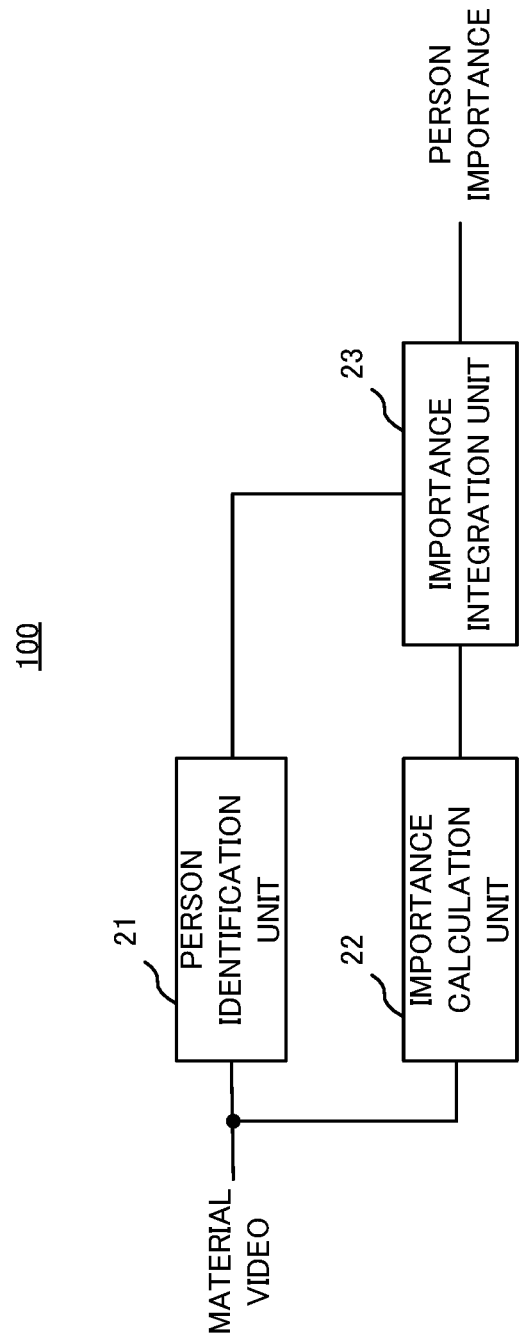
FIG. 4 is a block diagram showing a functional configuration of a person importance calculation device of a first example embodiment.

FIG. 4 is a block diagram showing functional configuration of the person importance calculation device 100 according to the first example embodiment. As illustrated, the person importance calculation device 100 includes a person identification unit 21, an importance calculation unit 22, and an importance integration unit 23.

The person identification unit 21 identifies a person included in the material video. Specifically, the person identification unit 21 detects a person from a set of one or more frames constituting the material video (hereinafter, referred to as a "video part") and determines the identity of the person to identify the person. Thus, as shown in FIG. 2, a plurality of persons included in the material video are identified as persons A, B and the like, respectively. The person identification unit 21 outputs information indicating the identified person and information including the time or frame number at which the person is identified (hereinafter, referred to as "identified person information") to the importance integration unit 23.

The importance calculation unit 22 calculates the importance in the material video. Specifically, the importance calculation unit 22 extracts the feature quantity from the video part constituting the material video and calculates the importance (importance score) for the material video based on the extracted feature quantity. It is noted that the importance calculated here is the importance of the unit video as a whole, and is not yet the importance of individual person. The importance calculation unit 22 outputs the calculated importance to the importance integration unit 23.

The importance integration unit 23 calculates the person importance using the identified person information inputted from the person identification unit 21 and the importance inputted from the importance calculation unit 22. Specifically, the importance integration unit 23 integrates the importance of the material video when the person is identified, in association with the person. For example, when the person A is identified in a certain video part of the material video, the importance integration unit 23 stores the importance of the video part as the person importance of the person A. When a plurality of persons A and B are identified in a certain video part of the material video, the importance integration unit 23 stores the importance of the video part as the person importance of the persons A and B, respectively. Also, when the person A once appeared in the material video appears again in another video part, the importance integration unit 23 adds the importance of the video part at that time to the person importance of the person. In this way, the importance integration unit 23 identifies a plurality of persons included in the material video, and integrates the importance of the video part at that time to the person importance of each person every time each person appears. Then, the importance integration unit 23 outputs the importance of each person, which is integrated for the entire material video, as the person importance.

Thus, the person importance calculation device 100 calculates the person importance for each person appearing in the material video. Therefore, based on the person importance, it is possible to evaluate which person plays an important role in the material video. For example, if the material video is a video of a sport game, the value of importance becomes high at the scoring scene or the scene of interest in that game. Accordingly, based on the importance of the person, it is possible to identify players who have played an active role or highly contributed in the game.

[Person Importance Calculation Processing]

Figure 5:
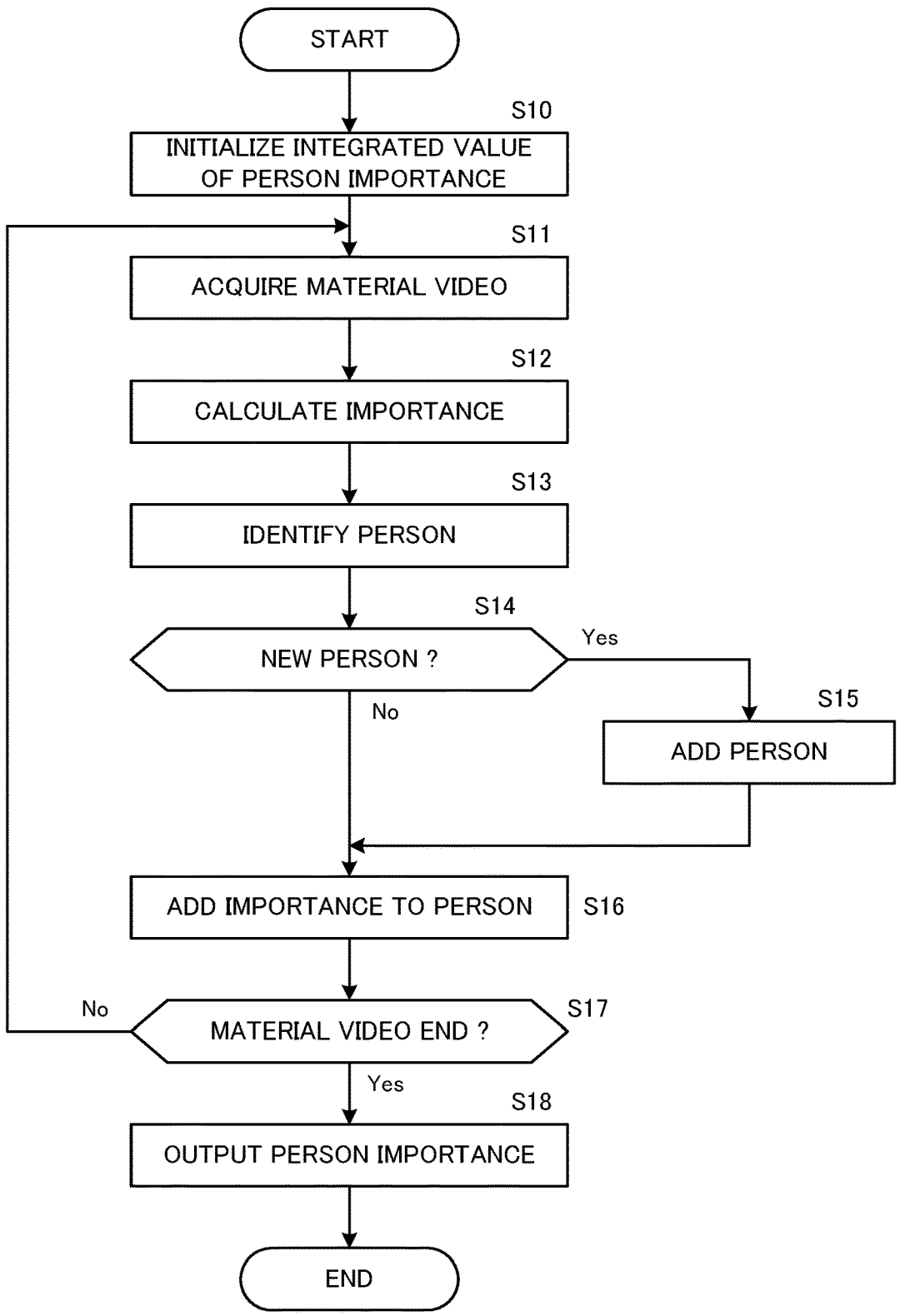
FIG. 5 is a flowchart of person importance calculation processing of the first example embodiment.

FIG. 5 is a flowchart of the person importance calculation processing according to the first example embodiment. This processing is realized by the processor 12 shown in FIG. 3, which executes a program prepared in advance and operates as each element shown in FIG. 4.

First, the importance integration unit 23 initializes the integrated value of the person importance of each person (step S10). In this example, it is assumed that several persons appearing in the material video are known. Next, the importance calculation unit 22 acquires the material video (step S11) and calculates the importance (step S12). Here, the importance calculation unit 22 acquires the material video of a predetermined video part based on a predetermined number of frames, a predetermined time width or the like, for example, and calculates the importance of the video part.

Next, the person identification unit 21 identifies a person from the same video part (step S13) and determines whether or not the person is a new person (step S14). If the person is a new person (step S14: Yes), the importance integration unit 23 adds a new person (step S15). Namely, the importance integration unit 23 prepares and initializes the integrated value for the new person. On the other hand, if the person is not a new person (step S14: No), the processing proceeds to step S16. In step S16, the importance of the video part at that time is added for the person identified in step S13.

Next, the person importance calculation device 100 determines whether or not the processing has been performed until the end of the material video (step S17). When the processing has not been performed until the end of the material video (step S17: No), the processing returns to step S11, and the processing of steps S11 to S16 is performed for the next video part. On the other hand, when the processing has been performed until the end of the material video (step S17: Yes), the importance integration unit 23 outputs the integrated person importance (step S18). Then, the processing ends.

Second Example Embodiment

Next, a person importance calculation device according to a second example embodiment will be described. The person importance generation device 100 of the first example embodiment generates the person importance using the importance of all the video parts of the material video. In contrast, the person importance calculation device 110 of the second example embodiment generates the person importance using the importance of only the important scene of the material video.

[Functional Configuration]

Figure 6:
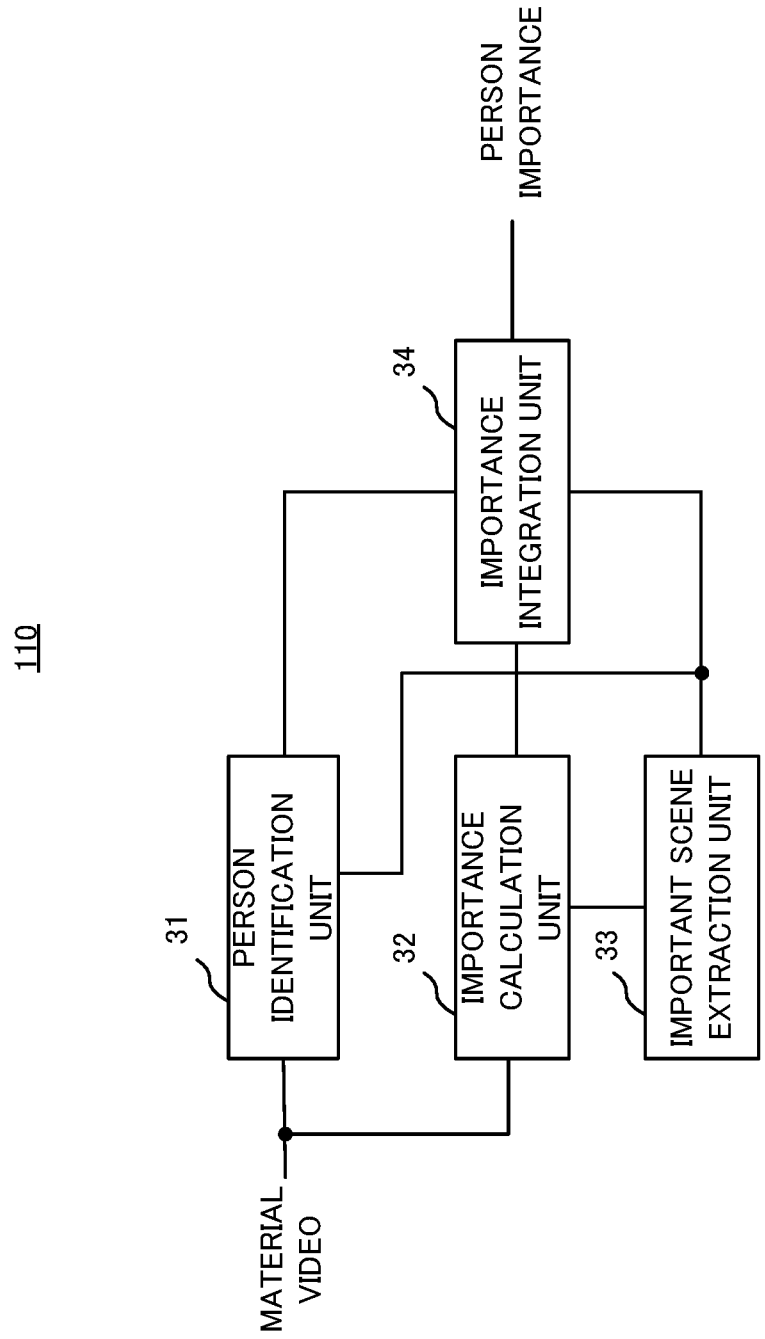
FIG. 6 is a block diagram showing a functional configuration of a person importance calculation device of a second example embodiment.

FIG. 6 shows a functional configuration of the person importance calculation device 110 according to the second example embodiment. The hardware configuration of the person importance calculation device 110 according to the second example embodiment is the same as that of the first example embodiment shown in FIG. 3. As illustrated, the person importance calculation device 110 includes a person identification unit 31, an importance calculation unit 32, an important scene extraction unit 33, and an importance integration unit 34, The importance calculation unit 32 calculates the importance of the material video in the same manner as in the first example embodiment. Then, the importance calculation unit 32 outputs the calculated importance to the importance integration unit 34 and the important scene extraction unit 33.

The important scene extraction unit 33 extracts the important scene from the material video based on the importance calculated by the importance calculation unit 32. Specifically, the important scene extraction unit 33 compares the importance calculated by the importance calculation unit 32 with a predetermined threshold value, and extracts a section in which the importance is equal to or higher than a predetermined threshold value as an important scene. Then, the important scene extraction unit 33 outputs information indicating an important scene to the person identification unit 31 and the importance integration unit 34.

Similarly to the first example embodiment, the person identification unit 31 identifies a person from the material video. However, the person identification unit 31 identifies the person only in the important scene of the material video, and outputs the identified person information indicating the identified person to the importance integration unit 34. Namely, the person identification unit 31 does not identify a person in the scenes other than the important scene (referred to as an "unimportant scene").

The importance integration unit 34 integrates the importance for each person only for the important scenes based on the identified person information inputted from the person identification unit 31, the importance inputted from the importance calculation unit 32, and the information indicating the important scene inputted from the important scene extraction unit 33. Namely, the importance integration unit 34 integrates the importance of the material video in the important scenes, for each person identified in the important scenes.

As described above, in the second example embodiment, the importance of each person is integrated to generate the person importance only for the important scenes in the material video. Therefore, it is possible to obtain the importance of the person included in the important scenes, i.e., the person with particularly high degree of activity and contribution.

[Person Importance Calculation Processing]

Figure 7:
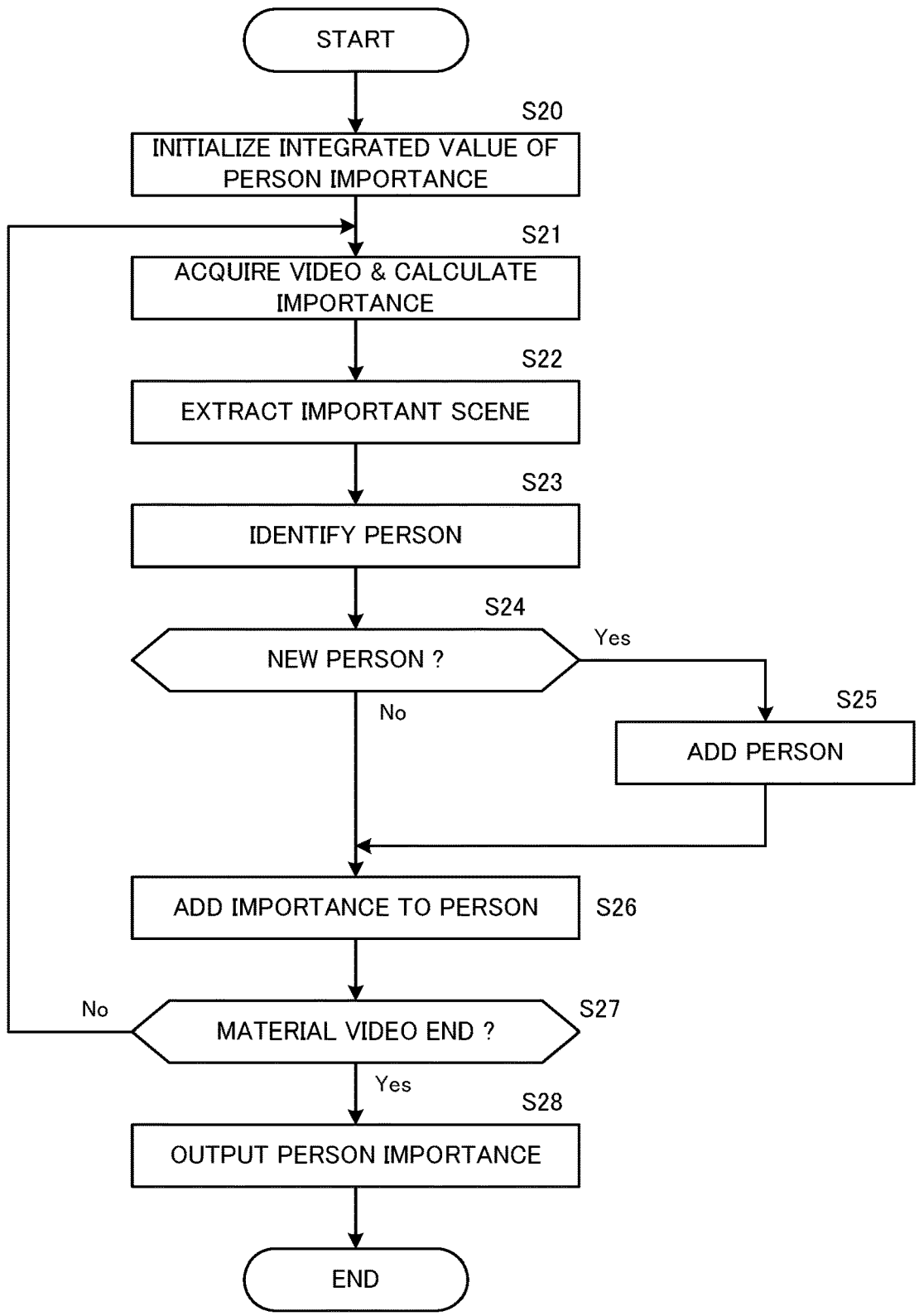
FIG. 7 is a flowchart of person importance calculation processing of the second example embodiment.

FIG. 7 is a flowchart of the person importance calculation processing according to the second example embodiment. This processing is implemented by the processor 12 shown in FIG. 3, which executes a program prepared in advance and operates as each element shown in FIG. 6.

First, the importance integration unit 34 initializes the integrated value of the person importance of each person (step S20). Also in this example, it is assumed that several persons appearing in the material video are known. Next, the importance calculation unit 32 acquires the material video and calculates the importance (step S21). Next, the important scene extraction unit 33 extracts the important scene in the material video based on the calculated importance (step S22).

Next, the person identification unit 31 identifies a person from the extracted important scene (step S23) and determines whether or not the person is a new person (step S24). If the person is a new person (step S24: Yes), the importance integration unit 34 adds a new person (step S25). Namely, the importance integration unit 34 prepares and initializes the integrated value for a new person. On the other hand, if the person is not a new person (step S24: No), the processing proceeds to step S26. In step S26, the importance of the material video at that time is added for the person identified in step S23. Thus, the importance of the material video at that time is added for the person identified in the important scene.

Next, the person importance calculation device 110 determines whether or not the processing has been performed until the end of the material video (step S27). When the processing has not been performed until the end of the material video (step S27: No), the processing returns to step S21, and the processing of steps S21 to S26 is performed for the next video part. On the other hand, when the processing has been performed until the end of the material video (step S27: Yes), the importance integration unit 34 outputs the integrated person importance (step S28). Then, the processing ends.

Modification

Next, a modification of the second example embodiment will be described. In the second example embodiment, the person importance calculation device 110 identifies persons in the important scenes in the material video and integrates the importance. However, among the persons appearing in the important scenes, there is a person who does not actually have a high degree of activity or contribution. For example, in the case of material video of a baseball game, the defensive players in the hit scene, the pitcher in home-run scene, and the batter in the strikeout scene appear in the important scenes, but their contribution to the team is not high. Therefore, the person importance calculation device 110 integrates the importance only for the person actually contributing in the important scenes by the following method.

(First Method)

In the first method, when a plurality of groups each including a plurality of persons appear in the material video, the important scene extraction unit 33 associates the important scene with one of the groups. Then, the importance integration unit 34 adds the importance of the important scene only for the persons belonging to the group to which the important scene was associated. As an example, when the material video is the video of a sport game, the important scene extraction unit 33 determines to which team the important scene is contributing, and associates the important scene with the team to which the important scene is contributing. For example, the important scene extraction unit 33 associates the important scene in which the batter of Team A got a hit or a home run to Team A, and associates the important scene in which the batter of Team A got a strikeout at a chance to the team B.

Then, the importance integration unit 34 adds the importance of the important scene for the players belonging to the associated team among the players included in the important scene. For example, if a batter of Team A and a pitcher of Team B appear in the scene in which the batter of Team A hits a home run, the importance integration unit 34 adds the importance of the important scene to the batter of Team A but does not add it to the pitcher of Team B. Thus, by determining to which team the important scene is contributing and adding the importance only to the person who is contributing to the team, it is possible to prevent that the importance is added to the person who appears in the important scene but is not actually contributing.

(Second Method)

The second method considers the length of time each person appears in the important scene. Specifically, the important scene extraction unit 33 calculates the time each person is appearing in the important scene. Then, the importance integration unit 34 adds the importance of the important scene only to the person who is appearing for the time equal to or longer than a predetermined threshold value of $\tau$ seconds. For example, if a batter of Team A and several defensive players of Team B appear in the important scene in which the batter of Team A got a hit, the importance is added to the player who got a hit with high probability because it is likely that the base running of the player after the hit is included in the important scene, but the importance is added to the defensive players with low probability because the time length the defensive players are appearing in the important scene is generally short. As another example, since a play by a defensive player is included for a long time in an important scene in which the defensive player has put a batter out by a fine play, the importance is added to the defensive player with high probability. In this way, the second method also prevents that that the importance is added to the person who appears in the important scene but is not actually contributing.

Third Example Embodiment

The third example embodiment applies the above-described person importance calculation device to a digest generation device.

[Basic Concept]

First, a basic concept of the digest generation device will be described. The digest generation device generates a digest video using multiple portions of the material video stored in the material video DB 2, and outputs the digest video. The digest video is a video generated by connecting important scenes in the material video in time series. The digest generation device generates a digest video using a digest generation model (hereinafter simply referred to as "generation model") trained by machine learning. For example, as the generation model, a model using a neural network can be used.

Figure 8:
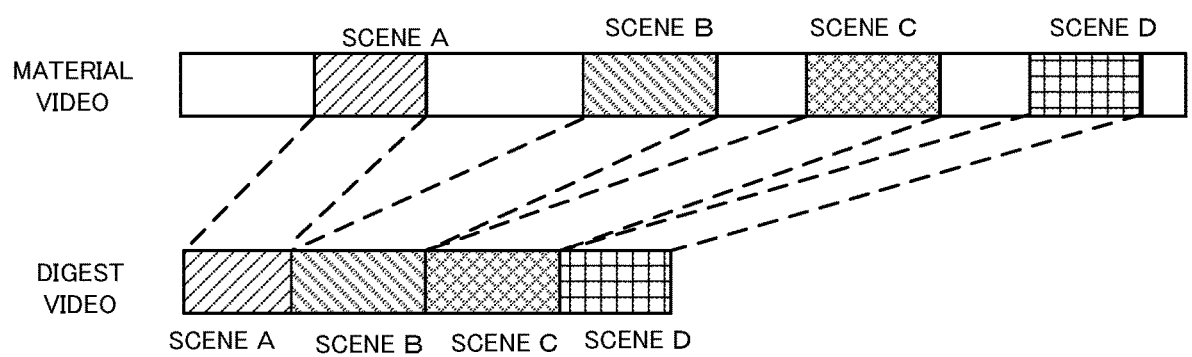
FIG. 8 shows an example of a digest video.

FIG. 8 shows an example of a digest video. In the example of FIG. 8, the digest generation device extracts scenes A to D included in the material video as the important scenes, and generates a digest video by connecting the important scenes in time series. Incidentally, the important scene extracted from the material video may be repeatedly used in the digest video in dependence upon its content.

[Functional Configuration]

Figure 9A:
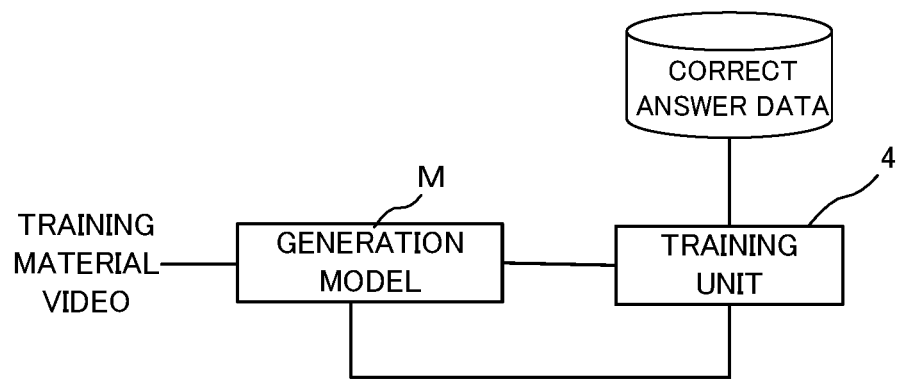
FIGS. 9A and 9B show functional configurations of a digest generation model at the time of training and inference.

FIG. 9A is a block diagram illustrating a configuration for training a generation model used by the digest generation device 200. A training dataset prepared in advance is used to train the generation model. The training dataset is a pair of a training material video and correct answer data showing a correct answer for the training material video. The correct answer data is data obtained by giving a tag (hereinafter referred to as "a correct answer tag") indicating the correct answer to the position of the important scene in the training material video. Typically, giving the correct answer tags to the correct answer data is performed by an experienced editor or the like. For example, for a material video of baseball broadcasting, a baseball commentator or the like selects highlight scenes during the game and give the correct answer tap. Also, the correct answer tag may be automatically given by learning a method of giving the correct answer tags by the editor using machine learning or the like.

At the time of training, the training material video is inputted to the generation model M. The generation model M extracts the important scenes from the material video. Specifically, the generation model M extracts the feature quantity from one frame or a set of multiple frames forming the material video, and calculates the importance (importance score) for the material video based on the extracted feature quantity. Then, the generation model M outputs a portion where the importance is equal to or higher than a predetermined threshold value as an important scene. The training unit 4 optimizes the generation model M using the output of the generation model M and the correct answer data. Specifically, the training unit 4 compares the important scene outputted by the generation model M with the scene indicated by the correct answer tag included in the correct answer data, and updates the parameters of the generation model M so as to reduce the error (loss). The trained generation model M thus obtained can extract scenes close to the scene to which the editor gives the correct answer tag as an important scene from the material video.

Figure 9B:
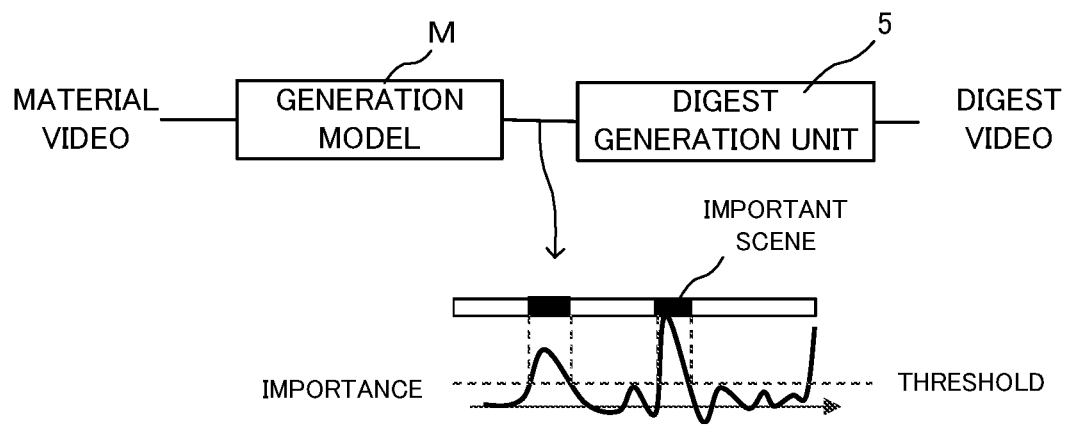

FIG. 9B illustrates a configuration f the digest generation device at the time of inference. At the time of inference, the material video subjected to the generation of the digest video is inputted to the trained generation model M. The generation model M calculates the importance from the material video, extracts the portions where the importance is equal to or higher than a predetermined threshold value as the important scenes, and outputs them to the digest generation unit 5. The digest generation unit 5 generates and outputs a digest video by connecting the important scenes extracted by the generation model M. In this way, the digest generation device generates a digest video from the material video using the trained generation model M. It is noted that the above-described generation model M can be used for the important scene extraction unit 33 of the second example embodiment.

[Digest Generation Device]

Figure 10:
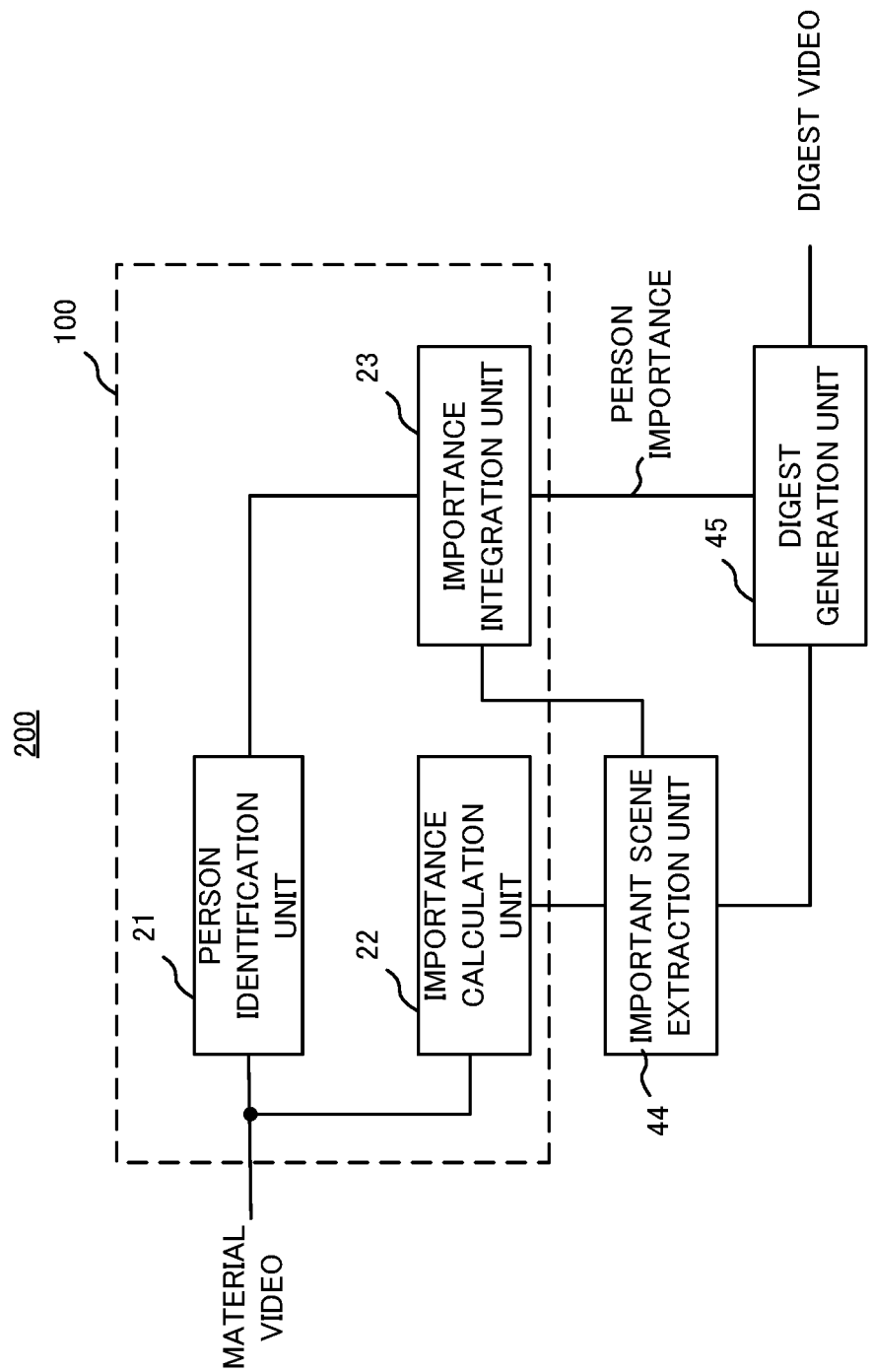
FIG. 10 is a block diagram showing a functional configuration of a digest generation device of a third example embodiment.

FIG. 10 shows a functional configuration of a digest generation device 200 to which the person importance calculation device 100 of the first example embodiment is applied. The digest generation device 200 includes a person importance calculation device 100, an important scene extraction unit 44, and a digest generation unit 45.

The person importance calculation device 100 includes a person identification unit 21, an importance calculation unit 22, and an importance integration unit 23, and operates as described in the first example embodiment. Also, the importance calculation unit 22 outputs the calculated importance to the important scene extraction unit 44. Further, the importance integration unit 23 outputs the calculated person importance to the digest generation unit 45.

As described with reference to FIG. 9B, the important scene extraction unit 44 uses the trained generation model M to extract important scenes based on the importance and outputs them to the digest generation unit 45. The digest generation unit 45 connects the inputted important scenes in time series to generate a digest image.

Further, the digest generation unit 45 creates a person display image based on the person importance inputted from the importance integration unit 23 and includes the person display image in the digest image. Specifically, the digest generation unit 45 generates a person display image, in which a person satisfying a predetermined condition is displayed, on the basis of the person importance. A person who satisfies a predetermined condition is, for example, a person whose person importance is the largest, a person whose person importance is in the top three rank, and so on. Also, if the material video is a game of sport, the person who satisfies a predetermined condition may be, for example, one of the players having the highest person importance in the winning team, or one of the pitchers and one of the fielders having the highest person importance in the winning team.

Figure 11:
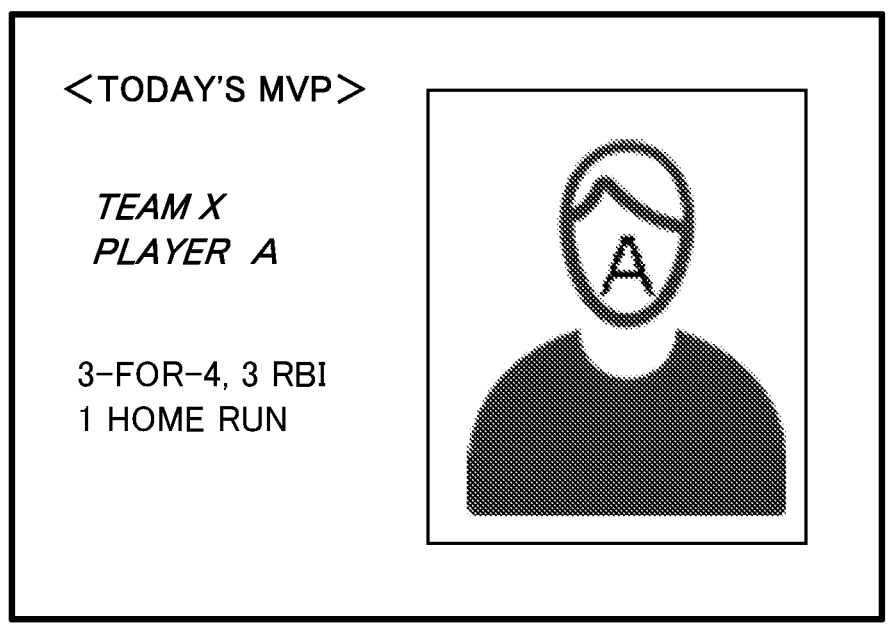
FIG. 11 shows an example of a person display image.

FIG. 11 shows an example of a person display image in which one player having the highest person importance is displayed when the material video is a baseball game. The digest generation unit 45 creates such a person display image based on the person importance and includes the image in the digest video. Incidentally, as the image of the person used in the person display image, an image prepared in advance for each person may be used. Thus, by applying the person importance calculation device to the digest generation device, it is possible to include the image of the person with high degree of activity and contribution in the material video such as a sport game in the digest video. In the example of FIG. 11, although the person display image is generated based on the person importance after the game is over, the person display image may be generated based on the person importance in the middle of the game and may be included in the digest video. For example, at the end of the seventh inning in the baseball game, or in the half-time of the soccer game, a person display image of a player who has been active so far may be generated and included in the corresponding position of the digest video.

In the above example, the person importance calculation device 100 according to the first example embodiment is applied to the digest generation device. Instead, the person importance calculation device 110 according to the second example embodiment may be applied to the digest generation device. In that case, the important scene extraction unit 33 included in the person importance calculation device 110 of the second example embodiment may be used as the important scene extraction unit 44 shown in FIG. 10.

Fourth Example Embodiment

Figure 12:
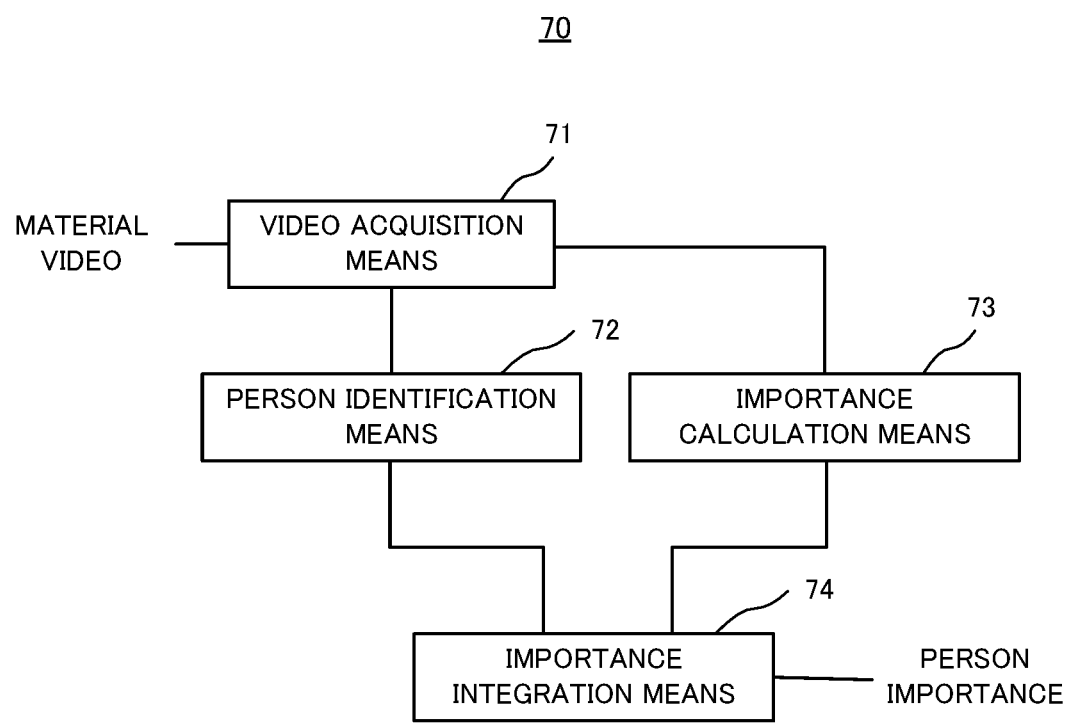
FIG. 12 is a block diagram showing a functional configuration of a video processing device of a fourth example embodiment.

Next, a fourth example embodiment of the present invention will be described. FIG. 12 is a block diagram showing a functional configuration of a video processing device according to the fourth example embodiment. As illustrated, the video processing device 70 includes a video acquisition means 71, a person identification means 72, an importance calculation means 73, and an importance integration means 74. The video acquisition means 71 acquires a material video. The person identification means 72 identifies a person from the material video. The importance calculation means 73 calculates an importance of the material video. The importance integration means 74 integrates the importance for each person and outputs a person importance indicating an importance for each person.

A part or all of the example embodiments described above may also be described as the following supplementary notes, but not limited thereto.

(Supplementary Note 1)

A video processing device comprising:

a video acquisition means configured to acquire a material video;

a person identification means configured to identify a
person from the material video;
an importance calculation means configured to calculate
an importance of the material video; and
an importance integration means configured to integrate
the importance for each person and output a person
importance indicating an importance of each person.

(Supplementary Note 2)

The video processing device according to Supplementary note 1, wherein, when the material video includes a person, the importance integration means adds the importance of the material video to the person importance of the person.

(Supplementary Note 3)

The video processing device according to Supplementary note 1, further comprising an important scene extraction means configured to extract an important scene from the material video based on the importance,
wherein the person identification means identifies a person in the important scene, and
wherein the importance integration means integrates the importance in the important scenes and outputs the person importance for the person identified in the important scenes, (Supplementary Note 4)

The video processing device according to Supplementary note 3,
wherein the material video includes a plurality of groups each including a plurality of persons,
wherein the important scene extraction means associates the important scene with one of the plurality of groups, and
wherein the importance integration means adds the importance of the important scene for a person belonging to the group to which the important scene is associated, among the persons included in the important scene.

(Supplementary Note 5)

The video processing device according to Supplementary note 4,
wherein the material video is a video of a sport game, the person bet player, the group being a team to which the player belongs,
wherein the important scene extraction means associates the important scene with one of the teams performing the game, and
wherein the importance integration unit adds the importance of the important scene for a player belonging to the team to which the important scene is associated, among the players included in the important scene.

(Supplementary Note 6)

The video processing device according to Supplementary note 3,
wherein, when the important scene includes a plurality of persons, the important scene extraction means calculates the time each person is included in the important scene, and
wherein the importance integration means adds the importance for a person who is included in the important scene for a time period equal to or longer than a predetermined time period.

(Supplementary note 7)

The video processing device according to Supplementary note 1 or 2, further comprising:
an important scene extraction means configured to extract an important scene from the material video based on the importance, and
a digest generation means configured to generate a digest video by connecting the important scenes in time series,
wherein the digest generation means includes a person display image displaying a person, whose person importance satisfies a predetermined condition, in the digest video.

(Supplementary Note 8)

The video processing device according to any one of Supplementary notes 3 to 6, further comprising a digest generation means configured to generate a digest video by connecting the important scenes in time series,
wherein the digest generation means includes a person display image displaying a person, whose person importance satisfies a predetermined condition, in the digest video.

(Supplementary Note 9)

A video processing method comprising:
acquiring a material video;
identifying a person from the material video;
calculating an importance of the material video; and
integrating the importance for each person and outputting a person importance indicating an importance of each person.

(Supplementary Note 10)

A recording medium recording a program that causes a computer to perform processing comprising:
acquiring a material video;
identifying a person from the material video;
calculating an importance of the material video; and
integrating the importance for each person and outputting a person importance indicating an importance of each person.

While the present invention has been described with reference to the example embodiments and examples, the present invention is not limited to the above example embodiments and examples. Various changes which can be understood by those skilled in the art within the scope of the present invention can be made in the configuration and details of the present invention.

DESCRIPTION OF SYMBOLS

2 Material video DB
4 Training unit
5 Digest Generation device
12 Processor
21, 31 Person identification unit
22, 32 Importance calculation unit
23 Importance integration unit
33, 44 Important scene extraction unit
100 Person importance calculation device
200 Digest generation device

What is claimed is:
1. A video processing device comprising:
a memory storing instructions; and
one or more processors configured to execute the instructions to:
acquire a material video;
calculate an importance of each of a plurality of images included in the material video;
extract an important scene from the material video based on the importance calculated for each image;
identify one or more persons included in the important scene in any of the images integrate, for each identified person, the importance of each image having the important scene including the identified person; and output, for each identified person, the integrated importance as a person importance of the identified person.

2. The video processing device according to claim 1,
wherein the material video includes a plurality of groups each including a plurality of persons,
wherein the one or more processors associate the important scene with one of the plurality of groups, and
wherein the one or more processors add the importance of the important scene for a person belonging to the group to which the important scene is associated, among the persons included in the important scene.

3. The video processing device according to claim 2,
wherein the material video is a video of a sport game, the person being a player, the group being a team to which the player belongs,
wherein the one or more processors associate the important scene with one of the teams performing the game, and
wherein the one or more processors add the importance of the important scene for a player belonging to the team to which the important scene is associated, among the players included in the important scene.

4. The video processing device according to claim 1,
wherein, when the important scene includes a plurality of persons, the one or more processors calculate a time each person is included in the important scene, and
wherein the one or more processors add the importance for a person who is included in the important scene for a time period equal to or longer than a predetermined time period.

5. The video processing device according to claim 1,
wherein the one or more processors are further configured to execute the instructions to generate a digest video by connecting the images including the important scene in time series, wherein the one or more processors include a person display image displaying a person for which the person importance satisfies a predetermined condition, in the digest video.

6. A video processing method performed by a computer and comprising:
acquiring a material video;
calculating an importance of each of a plurality of images included in the material video;
extracting an important scene from the material video based on the importance calculated for each image;
identifying one or more persons included in the important scene in any of the images
integrating, for each identified person, the importance of each image having the important scene including the identified person; and
outputting, for each identified person, the integrated importance as a person importance of the identified person.

7. A non-transitory computer-readable recording medium storing a program executable by a computer to perform processing comprising:
acquiring a material video;
calculating an importance of each of a plurality of images included in the material video;
extracting an important scene from the material video based on the importance calculated for each image:
identifying one or more persons included in the important scene in any of the images
integrating, for each identified person, the importance of each image having the important scene including the identified person; and
outputting, for each identified person, the integrated importance as a person importance of the identified person.

* * * * *